March 14, 1961    G. R. MACHIAN    2,974,405
ADJUSTABLE APPARATUS FOR HOLDING AND ASSEMBLING ARTICLES
Filed Sept. 25, 1958    3 Sheets-Sheet 1

INVENTOR
G.R. MACHIAN
BY R. P. Miller
ATTORNEY

March 14, 1961 G. R. MACHIAN 2,974,405
ADJUSTABLE APPARATUS FOR HOLDING AND ASSEMBLING ARTICLES
Filed Sept. 25, 1958 3 Sheets-Sheet 2
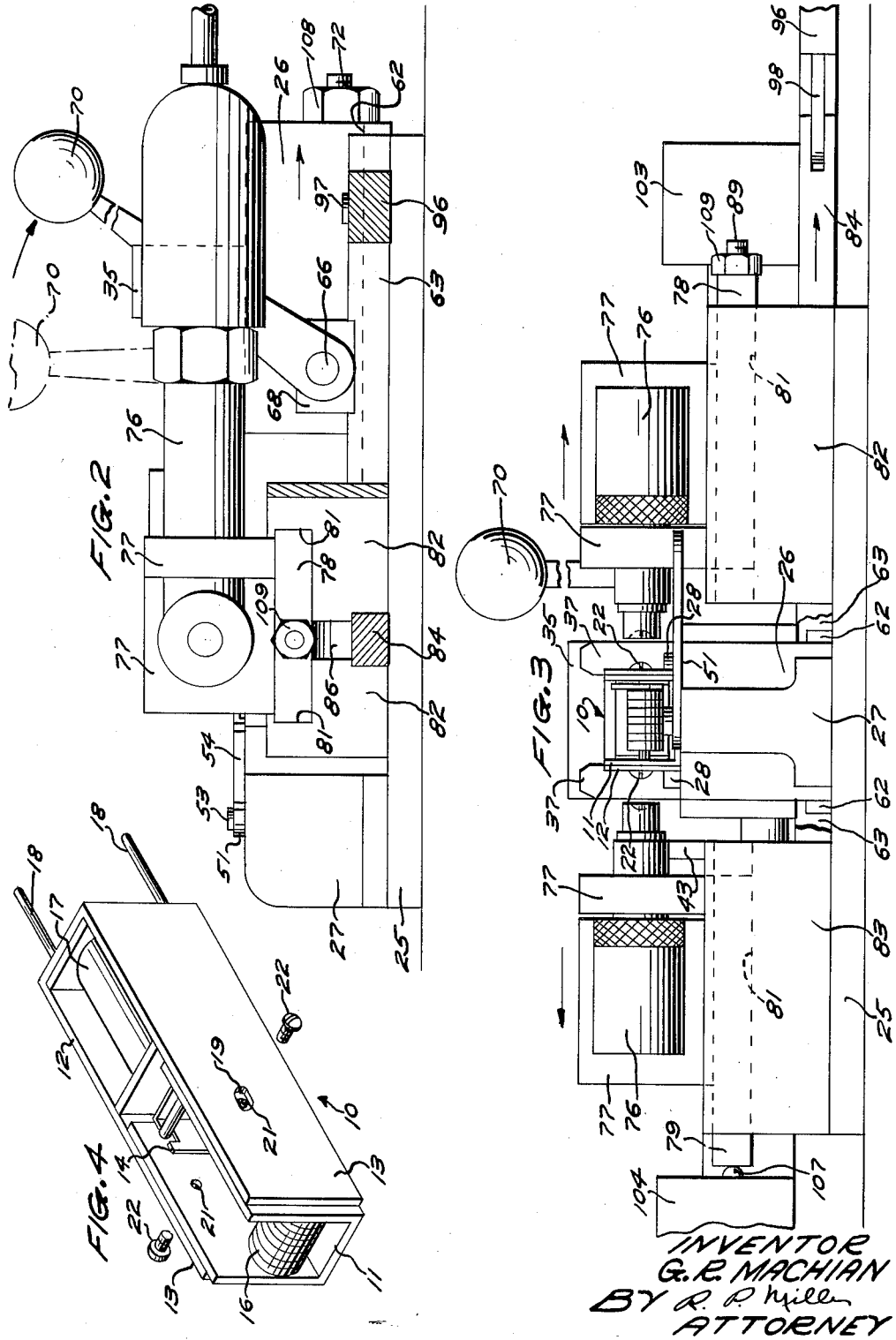
INVENTOR
G. R. MACHIAN
BY R. P. Miller
ATTORNEY

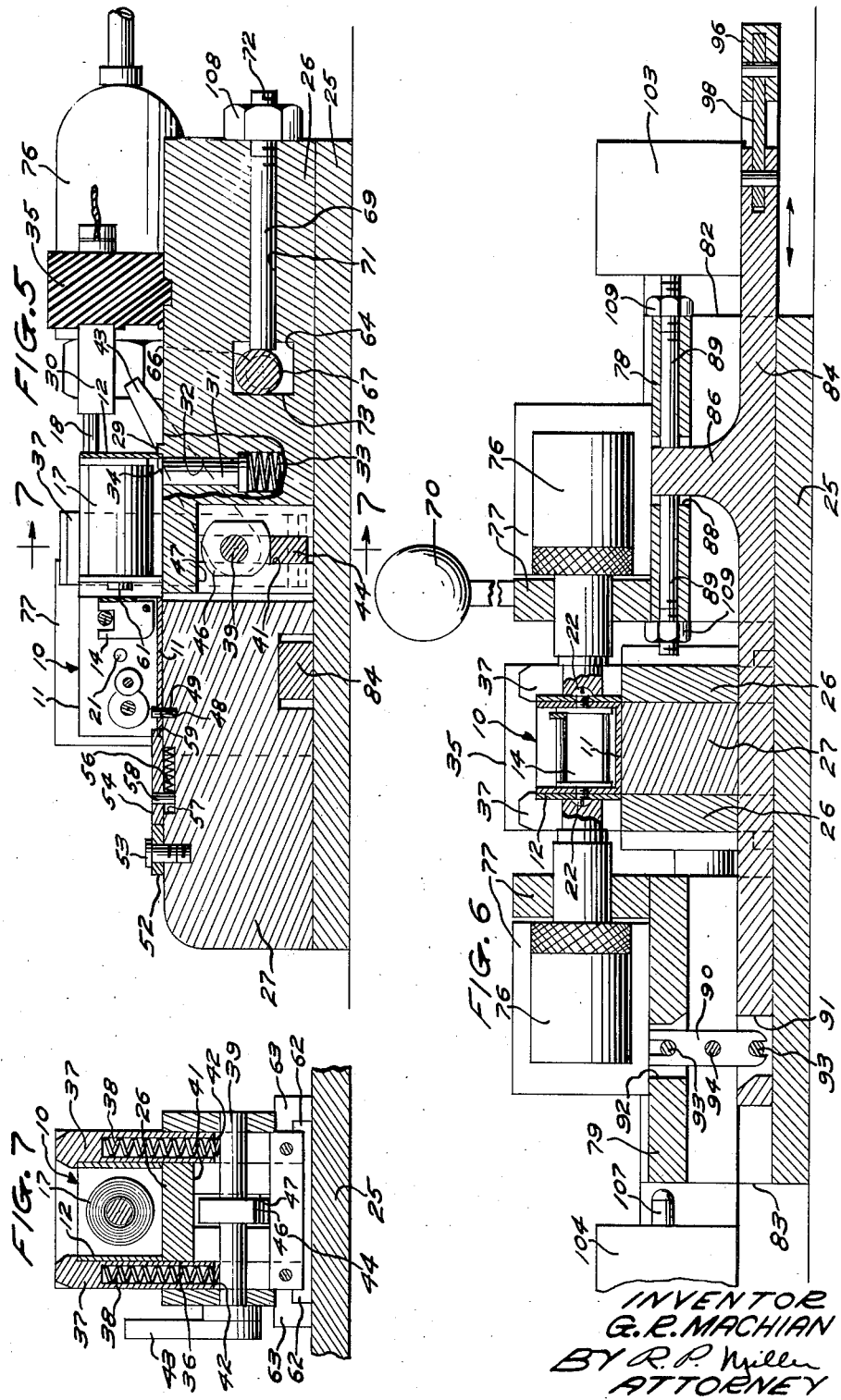

United States Patent Office 2,974,405
Patented Mar. 14, 1961

2,974,405

ADJUSTABLE APPARATUS FOR HOLDING AND ASSEMBLING ARTICLES

George R. Machian, North Riverside, Ill., assignor to Western Electric Company, Incorporated, New York, N.Y., a corporation of New York Filed Sept. 25, 1958, Ser. No. 763,338

9 Claims. (Cl. 29—203)

This invention relates to an adjustable apparatus for holding and assembling articles, or more particularly, to an apparatus for adjustably holding a core and an armature while a precise air gap is attained therebetween and the core and armature are secured in an exact desired spaced relationship.

The manufacturer of many diverse types of electrical and mechanical devices requires the provision of holding and locating facilities that may be adjusted to precisely locate one component with respect to another. These facilities should be designed to firmly hold the components in position during the subsequent operation of instrumentalities that function to secure the components together. Further, the holding and locating facilities must avoid any interference with the operation of the securing instrumentalities.

It is therefore an object of this invention to provide a new and improved adjustable apparatus for holding and assembling articles.

A further object of this invention is to provide a fixture that may be adjusted to move a pair of frames relative to one another to vary an air gap between an armature carried by one frame and a core carried by another frame.

A further object of this invention is to provide a fixture comprising a stationary platform for fixedly supporting a first frame and a movable slide for gripping and moving a second frame to vary the air gap between an armature carried by the first frame and a core carried by the second frame.

A still further object of the invention is to provide movable and stationary supports for clamping and supporting articles while adjusting the relative positions of the articles, together with facilities for securing the articles to one another.

With these and other objects in view, the present invention contemplates an adjustable apparatus comprising a stationary platform having means for securing a first article thereon. A bifurcated slide is mounted to move to and from the stationary platform and has means thereon for securely gripping a second article. A means is provided for moving the bifurcated slide in relation to the stationary platform positioned between the furcations of the slide to obtain a desired spaced relationship between the two articles. Securing instrumentalities are movably mounted on both sides of the slide and stationary platform and a means is provided for causing the securing instrumentalities to converge upon the articles accurately positioned by the platform and slide to assemble the two articles.

Other objects, advantages and novel aspects of the invention will become apparent upon consideration of the following detailed description, in conjunction with the accompanying drawings wherein:

Fig. 2 is a side elevation view, partially cut away, of the apparatus shown in Fig. 1;

Fig. 3 is a front elevation view of the apparatus showing a message register positioned within a fixture and a pair of air-driven screw drivers for securing the parts of the register together;

Figure 1:
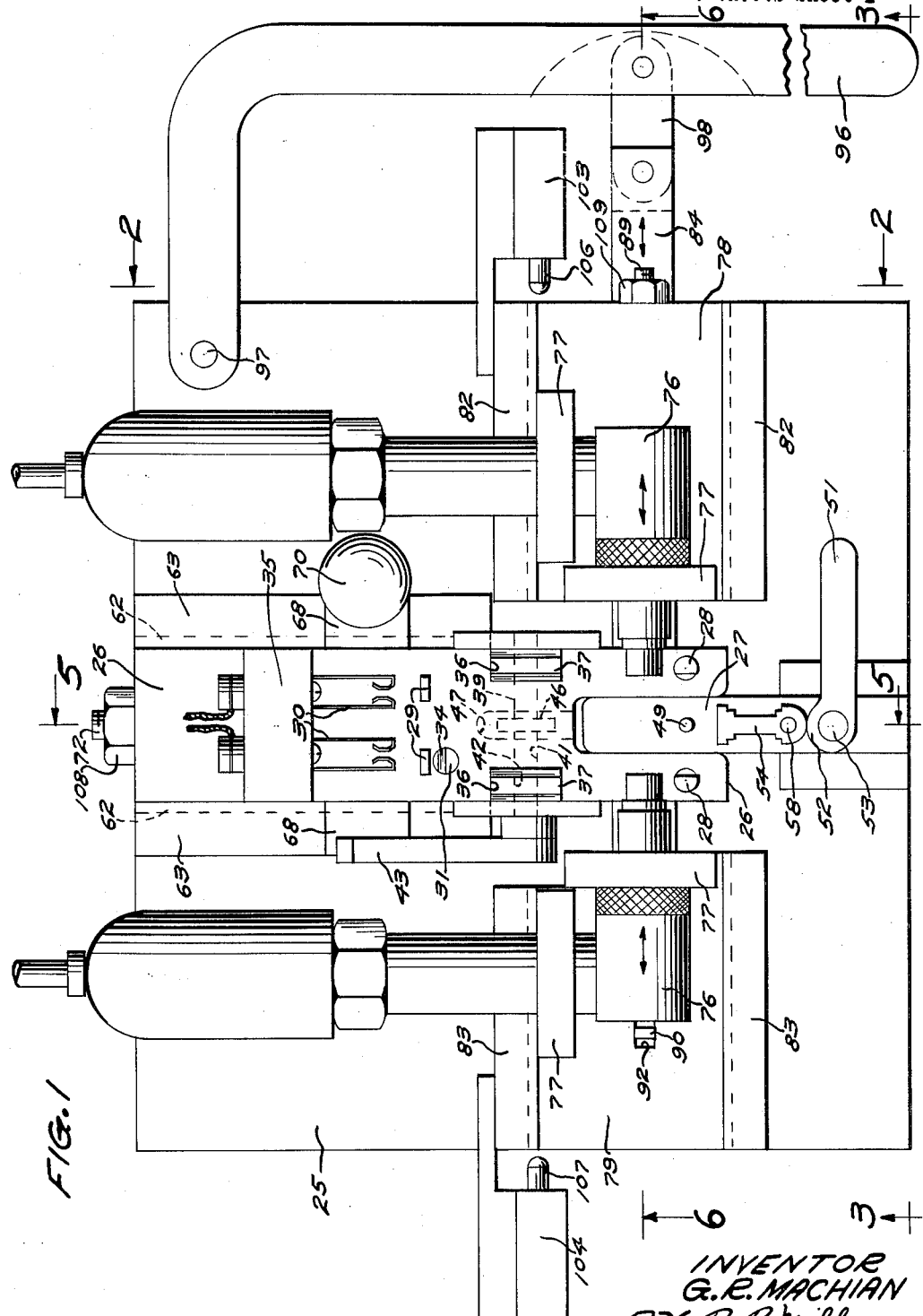
Fig. 1 is a top plan view of an adjustable apparatus for use in assembling articles in accordance with the principles of the present invention.

Fig. 4 discloses an enlarged perspective view of a message register of a type that may be assembled in the fixture;

Fig. 5 is a sectional view taken along line 5—5 of Fig. 1 illustrating clamping facilities for holding the parts of a message register in position during an assembling operation;

Fig. 6 is a sectional view taken along line 6—6 of Fig. 1 illustrating a pair of air-driven screw drivers and means for moving the screw drivers towards an article to be assembled; and Fig. 7 is a sectional view taken along line 7—7 of Fig. 5 disclosing a pair of cam operated clamps for securing a component part of an article upon a movable slide and the adjustable fixture.

This invention is described with relation to an apparatus for adjusting and assembling articles, such as a message register which records the number of message units used by a telephone subscriber. As shown in Fig. 4 a message register 10 comprises a first U-shaped frame 11 and a second frame 12 having parallel extensions 13. The U-shaped frame 11 carries a movable armature 14 which is mounted to actuate a counting mechanism 16 through an intervening mechanism (not shown). The U-shaped frame is placed between the parallel extensions 13 of the frame 12 which supports an electrical coil 17 and a pair of terminals 18. The extensions 13 are provided with slots 19 which are aligned with threaded apertures 21 provided in the vertical walls of the frame 11. The two frames 11 and 12 are secured together by means of screws 22 which pass through the slots 19 and into the apertures 21. It is to be understood that the above-described message register is simply illustrative of one type of article that may be adjusted and assembled within the fixture and that the fixture is applicable to facilitating the adjustment and assembly of other types of articles.

*Securing the message register*

Referring now to Fig. 1, a fixture forming one embodiment of the present invention may consist of a movable bifurcated slide 26 mounted on a base plate 25 for securely supporting the frame 12 of a message register. A stationary platform 27 also mounted on the base plate 25 is positioned between the furcations of the slide 26 for securely supporting the frame 11 of a message register. To assist an operator in the proper positioning of the frame 12 on the slide 26, the slide is provided with upwardly projecting aligning pins 28, stops 29 and a yieldable retaining pin 31 (see also Fig. 5).

As best shown in Fig. 5, the frame 12 is placed between the aligning pins 28 and slid along the top surface of the slide 26, depressing the yieldable retaining pin 31, until the back plate of the frame 12 strikes the stops 29. The retaining pin 31 is yieldably mounted within an aperture 32 in the slide 26 and is forced upwardly by means of a spring 33 so that a top upper camming portion 34 of the pin 31 projects above the upper surface of the slide 26. As the frame 12 is moved towards the stops 29, the back plate of the frame 12 will engage the cam portion 34 of the pin 31 to force the pin within the aperture 32. When the back plate of the frame 12 is positioned against the stops 29, the pin 31 is released and allowed to move to its upper position thereby retaining the back plate of the frame 12 between the stops 29 and the cam portion 34 of the pin 31. The terminals 18 on the frame 12 are thereby positioned within clips 30 imbedded in an insulator block 35 mounted to the slide and the clips are connected to any suitable source of electrical power (not shown) to move the armature 14 to its actuated position.

The slide 26 is provided with a pair of vertical slots 36 (Figs. 1 and 7) into which is placed a pair of clamping arms 37 which grip and secure the frame 12 to the slide. As shown in Fig. 7, the arms 37 are provided with apertures for retaining springs 38 which bear against a shaft 39 to force the arms 37 upwardly. The shaft 39 extends through transverse slot 41 formed within the slide 26 and slots 42 formed in the arms 37 and is provided with a handle 43. The arms 37 are pinned to a horizontal bar 44 which extends through the slots 41 and 42 beneath the shaft 39. The bar 44 engages and is moved by a cam 46 mounted on the shaft 39 and within a slot 47 provided in the slide 26. The handle 43 is moved to rotate the shaft 39 and cam 46 thereon to move the bar 44 and clamping arms 37 downwardly so that the frame 12 is tightly gripped against the upper surface of the slide 26.

The U-shaped frame 11 is then placed on the stationary platform 27 between the extensions 13 of the frame 12. The frame 11 is slid along the top surface of the platform 27 until an aperture 48 on the bottom surface of the frame 11 slips over a pin 49 projecting from the top surface of the platform 27 as viewed in Fig. 5. A handle 51 having a camming portion 52 is pivotally mounted on the platform 27 by means of bolt 53. The camming portion 52 of the handle 51 acts against a sliding clamp 54. The clamp 54 is urged by a spring 56 positioned within a recess 57 in the platform 27, acting against a pin 58 mounted in the sliding clamp 54 and projecting within the recess 57. As the handle 51 is rotated to the position shown in Figs. 1 and 5, the camming portion 52 moves the sliding clamp 54 against the force of the spring 56 and towards the frame 11 such that a notched-out portion 59 of the clamp 54 engages and retains the frame 11 on the platform 27. With the frames 11 and 12 so positioned, the armature 14 is placed in juxtaposition with a core 61 of the electrical coil 17 mounted in the frame 12 and as the coil 17 is connected to an electrical source, the armature 14 is in the actuated position.

Adjustment of air gap

The rear portion of the slide 26 is provided with outwardly flared projections 62 which fit within a notched portion of guide rails 63 mounted on the base plate 25 (Figs. 1 and 7), which allows the slide 26 to move longitudinally across the base plate. An aperture 64 (Fig. 5) is formed transversely through the slide 26 and has positioned therein, a shaft 66 carrying an eccentric cam 67. The shaft 66 is rotatably mounted in bushings 68 on guide rails 63 and is rotated by means of a handle 70. When the shaft 66 is rotated clockwise as viewed in Fig. 5, the eccentric cam 67 mounted on the shaft bears against a rod 69 which is secured within aperture 71 in the slide 26 by means of threaded portion 72. Such a clockwise movement of the cam 67 forces the high portion of the cam against the rod 69 to move the rod, and therefore the slide 26, to the right. Likewise, a counterclockwise movement of the shaft 66 moves the high portion of the cam 67 against the forward surface 73 of the aperture 64 to move the slide 26 to the left. All that is necessary, therefore, for an operator to adjust the air gap between armature 14 on frame 11 and core 61 on frame 12 of the message register, is to grasp the handle 70 and move the slide 26 back and forth while placing a gage between the armature and core until the correct air gap is obtained.

Assembling the message register

With the precisely obtained air gap between the armature and core, a pair of screws 22 are now inserted through the slots 19 in the extensions 13 of the frame 12 and into the threaded apertures 21 in the frame 11 while the two frames are properly positioned and securely held. To seat the screws 22 in apertures 21, a pair of air-driven screw drivers 76, of any commercially available type, is mounted within the brackets 77 which are in turn mounted on slidable blocks 78 and 79. The slidable blocks 78 and 79 are mounted within grooves 81 (Fig. 2) formed in two pairs of blocks 82 and 83 which are in turn mounted on base plate 25.

The stationary platform 27 and the slide 26 are provided with slots to accommodate a transversely extending bar 84 which is reciprocable therethrough and between the two pairs of blocks 82 and 83. The slidable block 78 is connected to the bar 84 by means of a boss 86 on the bar which extends between the blocks 82 and into slot 88 in slidable block 78. The boss 86 is clamped within the slot 88 by means of threaded shafts 89 extending through the slidable block 78 and projecting within the slot 88. The slidable block 79 is connected to the bar 84 by means of a lever 90 which terminates in a slot 91 within bar 84 and in slot 92 in slidable block 79 and is mounted within the slots 91 and 92 by means of pins 93. The lever 90 is pivoted by means of a pin 94 extending between the blocks 83.

The bar 84 is reciprocated by means of an arm 96 which is pivotally connected to the base plate 25 by means of pin 97 and is connected to the arm 84 by means of link 98. It may be understood, that as the bar 84 is moved to the left by means of handle 96, the boss 86 of bar 84 and the lever 90 cause the slidable blocks 78 and 79 and the power driven screw drivers 76 mounted thereto, to move inwardly towards the frames 11 and 12 to secure screws 22 within the threaded apertures 21 in the frame 11.

Operation

In the use of the above-described apparatus, an operator first moves the frame 12 of a message register 10 between the aligning pins 28 and along the top surface of the slide 26 until the back plate of the frame 12 is positioned between the stops 29 and the camming portion 34 of the retaining pin 31. The handle 43 is then rotated to cause the cam 46 to move the bar 44, and therefore the clamping arms 37, downwardly to secure the frame 12 on the slide 26.

The operator then inserts the frame 11 between the extensions 13 of the frame 12 and places the frame 11 on the stationary platform 27 such that the pin 49 extends through the aperture 48 on the bottom surface of the frame 11. The handle 51 is then rotated to cause the camming portion 52 of the handle to move the sliding clamp 54 against the force of the spring 56 to securely grip the frame 11 to the platform 27.

The operator next applies electrical current to the clips 30 to actuate the armature 14 towards the core 61 and places a gage between the armature and core. While the gage is so positioned, the handle 70 is moved back and forth, rotating the shaft 66 and the eccentric cam 67 to move the slide 26 until the proper air gap is obtained between the armature and core.

When the predetermined air gap is obtained, the operator inserts the screws 22 through the slots 19 and partially within the threaded apertures 21. The handle 96 is then moved to the left as viewed in Figs. 1 and 5 which likewise moves the bar 84 to the left causing the sliding blocks 78 and 79, and the associated air driven screw drivers 76, to move inwardly to seat the screws 22 within the threaded apertures 21 in the frame 11. A pair of switches 103 and 104 may be mounted on blocks 82 and 83 and connected to the air driven screw drivers 76 by any suitable means (not shown) to actuate the screw drivers 76 to the on and off positions as the slidable blocks 78 and 79 engage a pair of actuator plungers 106 and 107 of the switches 103 and 104 respectively.

It may also be noted that the rod 69 within the slide 26 may be provided with a nut 108 to adjust the amount of movement of the slide 26 by varying the amount of engagement between the rod and cam. The rods 89 are likewise provided with nuts 109 in order to vary the movement of the sliding blocks 78 and 79 upon movement of the bar 84.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An apparatus for holding and assembling articles which comprises, a base, a movable bifurcated slide member mounted to said base and having aligning and stop means for positioning a first article thereon, said slide having a first clamping means, movable to retain the first article on the slide member, a stationary platform mounted on said base between the furcations of the slide member and having stop means for engaging and positioning a second article thereon interleaved with the first article, a second clamping means on said platform movable to retain the second article on the platform, means for actuating the first and second clamping means, means for moving the slide member to and from the platform to adjust the articles in a predetermined longitudinal relationship, a pair of assembling devices mounted on said base and on opposite sides of said slide and platform and movable on said base into position to assemble the clamped interleaved articles, means for moving a first of the assembling devices toward the clamped articles, and a linkage spanning the slide and platform interconnecting said assembling devices for simultaneously moving the other assembling device toward the clamped interleaved articles.

2. In an adjustable apparatus for clamping articles to be assembled, a base, a bifurcated member slidably mounted on said base and having a plurality of projections extending from the top surface thereof for aligning a first article thereon, a stationary platform mounted on said base between the furcations of said member and having a projection extending from the top surface thereof for aligning a second article thereon in interleaved relation with the first article, said bifurcated member and platform each having cam actuated clamping means movable to securely grip the articles in the aligned positions, means for operating said cam actuated clamping means, a camming means for sliding said member to and from the platform to adjust the articles in a predetermined longitudinal spaced relationship, means for operating said camming means, a pair of devices mounted on said base on opposite sides of said bifurcated member and platform and movable on said base into position to assemble the clamped interleaved articles, means for moving a first of the assembling devices towards the clamped articles, and a linkage spanning the bifurcated member and platform interconnecting said assembling devices for simultaneously moving the other assembling devices toward the clamped interleaved articles.

3. An apparatus for positioning a first article between a pair of parallel spaced projections of a second article which comprises, a base, a stationary platform mounted on said base and having aligning means projecting from the top surface thereof for positioning a first article, a first clamping means movably mounted on said platform for securely gripping the first article thereto, a bifurcated member movably mounted on said base and having aligning means projecting from the top surface thereof for positioning a second article having parallel spaced projections extending along the furcations of the member, second clamping means movably mounted on said member for securely gripping the second article thereto, said member having the furcations extending along either side of the platform, means for operating the first and second clamping means, means for moving the bifurcated member to and from the platform to position the first article between the parallel projections in a predetermined spaced relationship to the second article, reciprocable blocks movably mounted adjacent to said platform and bifurcated member for supporting assembling mechanisms, and means for moving the blocks to and from the articles to move the assembling mechanisms to secure the first article to the parallel projections of the second article while the articles are clamped in said predetermined spaced relationship.

4. A slidable work positioning device which comprises, a base, a pair of spaced guide rails mounted on said base and having longitudinally extending grooves, a work support mounted between the rails and having flanges projecting therefrom for mating with the grooves in said guide rails, aligning and clamping means mounted on said support for positioning and securing a workpiece to the support, said support having a transverse aperture extending therethrough, a shaft having an eccentric cam thereon rotatably mounted on said base and extending through the aperture and engaging said support, a rod adjustably positioned within said support and projecting into the aperture for engaging the cam, means for adjusting the amount of engagement between the rod and cam, and means for rotating said shaft to rotate said cam and thus to move the support with respect to said rails.

5. A work supporting fixture which comprises, a support having a plurality of aligning projections and stop means extending from the top surface thereof, a resiliently mounted retaining pin imbedded within the support and having a camming projection extending beyond the top surface of the support whereby the pin is retracted upon passage of a workpiece thereover and returns to an extended position to hold the article between the stops and camming projection, said support having a transverse aperture through the underneath side thereof and vertical grooves extending upwardly from the extremities of the aperture, clamping arms movably mounted in said grooves and having a slot therein aligned with said aperture, a shaft having a cam thereon rotatably mounted to the support and through the aperture and slots, a bar within said aperture and slots engaging the cam and connecting the ends of the clamping arms, and means for rotating the shaft to rotate said cam and to actuate said bar to move the clamping arms to clamp a workpiece to the support.

6. In a slidable work positioning device, a base, a pair of spaced guide rails mounted on said base and having longitudinally extending grooves, a work support mounted between the rails and having flanges projecting therefrom into the grooves in said guide rails, said support having a plurality of aligning and positioning pins extending from the top surface thereof, a resiliently mounted retaining pin imbedded within the support and having camming projection extending beyond the top surface of the support for holding a workpiece against the positioning pins, said support having a first transverse aperture through the underneath side thereof and vertical grooves extending upwardly from the extremities of the first aperture, clamping arms movably mounted in said grooves and having a slot therein aligned with said first aperture, a first shaft having a cam thereon rotatably mounted on the support and extending through the first aperture and slots, a bar connected to the two clamping arms and extending through said aperture and slots to engage the cam, means for rotating the first shaft to move the arms to clamp a workpiece to the support, said support having a second transverse aperture, a second shaft having an eccentric cam rotatably mounted on said base and extending through the second aperture, a rod adjustably mounted within said support and projecting into the second aperture for engaging the eccentric cam, means for adjusting the amount of contact between the rod and eccentric cam, and means for rotating the second shaft to move the support and workpiece clamped thereon.

7. A fixture for positioning a first article between a pair of parallel spaced projections of a second article which comprises, a base, a stationary platform mounted on said base and having aligning and clamping means thereon for securely holding a first article, a pair of spaced guide rails mounted on said base extending in a direction towards said platform and having longitudinal grooves therein, a bifurcated support mounted between the guide rails with the furcations on either side of the platform and having flanges for mating with the grooves in the guide rails, said support having aligning and clamping means thereon for securely holding a second article having parallel spaced projections positioned on the furcations of the support, said support having a transverse aperture extending therethrough, a shaft having an eccentric cam rotatably mounted on said base and within the aperture, a rod adjustably imbedded within said support and projecting into the aperture for engaging the cam, means for adjusting the amount of engagement between the rod and cam, and means for rotating the shaft for moving the support to and from said platform to position the two articles in a predetermined spaced relationship.

8. An apparatus for holding and assembling articles which comprises, a base, a movable bifurcated slide member mounted to said base and having a first clamping means movable to retain the first article on the slide member, a stationary platform mounted on said base between the furcations of the slide member, a second clamping means on said platform movable to retain the second article on the platform in interleaved relation with the first article, means for actuating the first and second clamping means, means for moving the slide member to and from the platform to adjust the articles in a predetermined longitudinal relationship, a pair of assembling devices mounted on said base and on opposite sides of said slide and platform and movable on said base into position to assemble the clamped interleaved articles, means for moving a first of the assembling devices toward the clamped articles, and a linkage spanning the slide and platform interconnecting said assembling devices for simultaneously moving the other assembling device toward the clamped interleaved articles.

9. The apparatus as recited in claim 8, wherein a cam is provided for moving the slide member to and from the platform to adjust the articles in a predetermined longitudinal relationship.

References Cited in the file of this patent
UNITED STATES PATENTS

| | | |
|---|---|---|
| 2,518,009 | Hess | Aug. 8, 1950 |
| 2,663,334 | Tinsman | Dec. 22, 1953 |
| 2,820,283 | Anderson | Jan. 21, 1958 |
| 2,865,089 | Machian | Dec. 23, 1958 |
| 2,873,516 | McCain | Feb. 17, 1959 |